D. MASOR.
EXPANSION BOLT.
APPLICATION FILED JAN. 14, 1913.
1,072,246.
Patented Sept. 2, 1913.
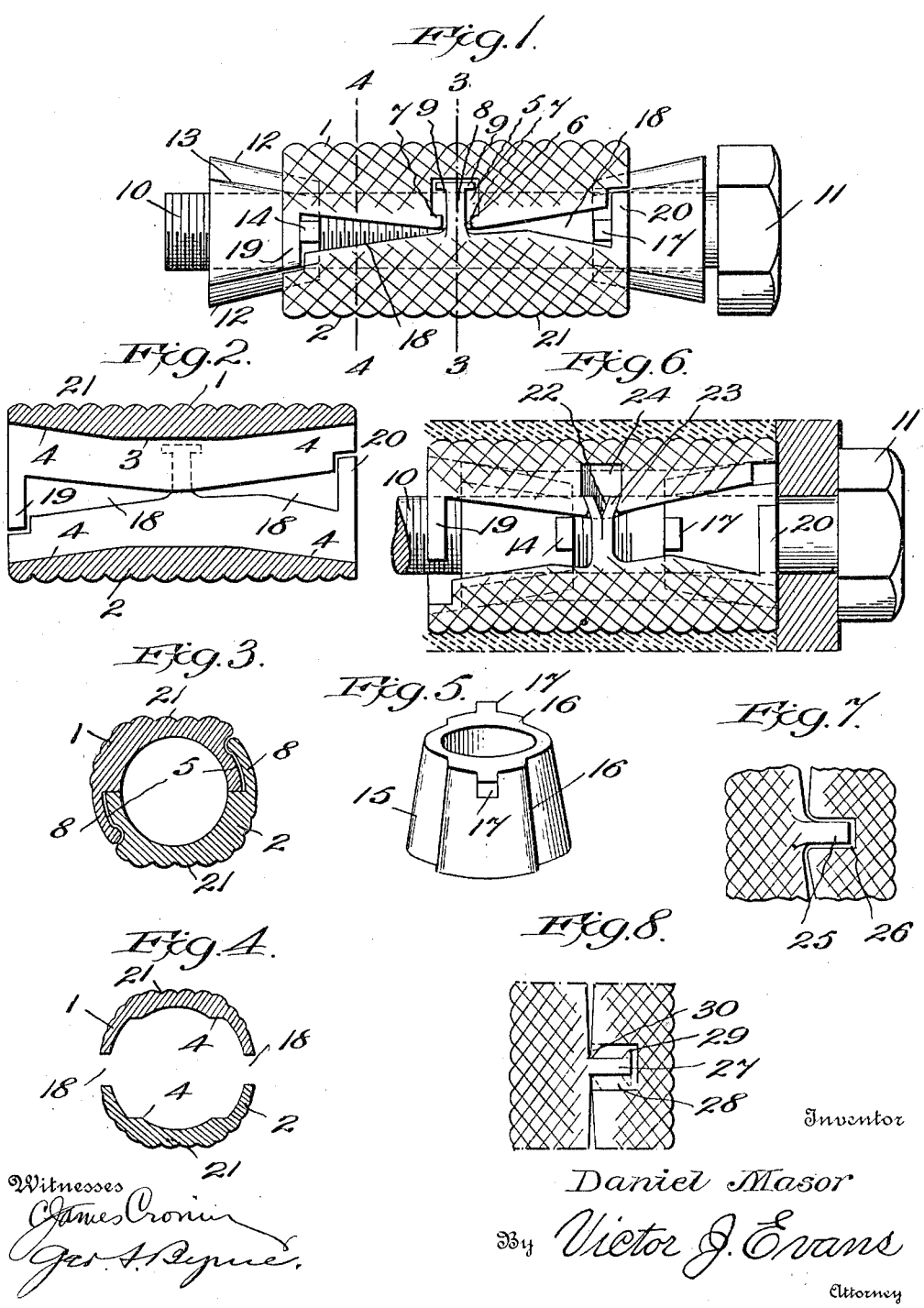
Inventor
Daniel Masor
By Victor J. Evans
Attorney
Witnesses

UNITED STATES PATENT OFFICE.

DANIEL MASOR, OF NEW YORK, N. Y.

EXPANSION-BOLT.

1,072,246.   Specification of Letters Patent.   Patented Sept. 2, 1913.

Application filed January 14, 1913. Serial No. 742,023.

*To all whom it may concern:*

Be it known that I, DANIEL MASOR, a citizen of the United States, residing at New York city, in the county of New York and State of New York, have invented new and useful Improvements in Expansion-Bolts, of which the following is a specification.

This invention relates to expansion bolts and has for its object to provide a comparatively simple and inexpensive device of this character, with but few parts and which, when assembled together, will not become separated and lost during shipment.

To these ends the invention consists in the novel details of construction and combination of parts more fully hereinafter described and particularly pointed out in the claims.

Referring to the accompanying drawings forming a part of this specification in which like numerals designate like parts in all the views:—Figure 1 is a side elevational view of my improved bolt. Fig. 2 is a longitudinal sectional view of the opposed jaw members. Fig. 3 is a cross sectional view taken on the line 3—3 of Fig. 1. Fig. 4 is a cross sectional view taken on the line 4—4 of Fig. 1. Fig. 5 is a detail perspective view of one of the tapering nuts. Fig. 6 is a side elevational view of a modified form of expansion bolt shown secured to position on a wall. Fig. 7 is a modified form of means for securing the opposed jaw members together, and Fig. 8 is a view showing another modified form of a means for securing the opposed jaw members together.

My improved bolt is intended for securing objects to stone, ceramic or similar types of walls where the ordinary bolt is unfit for accomplishing this purpose, and comprises a pair of opposed jaw members 1 and 2 provided with the inner hollow portions 3 which taper off and are provided with shouldered ends as indicated at 4. At the medial outer portions of each of the opposed jaw members, are provided rectangular counter-sunks 5 which terminate in reduced portions 6 to form shoulders 7. Projecting hooks 8 also formed on each of the jaw members, are mounted within the counter-sunks and are provided at their outer ends with extended or lug portions 9 which are adapted to engage the shoulders 7 and thereby prevent the separation of the jaws when the bolt is not in use.

Through the jaw members is inserted a screw threaded bolt 10 provided at one end with the usual head 11 and at its other or screw threaded end, with a tapering screw threaded nut 12 which is provided on its opposed sides with enlarged or shouldered portions 13 on the inner ends of which are located two radially extending lugs 14.

Loosely mounted on the opposite or smooth end portion of the bolt, is a tapering reamed nut 15, preferably the same size and shape as the opposite or screw threaded nut, and provided on its opposed sides with enlarged or shouldered portions 16 on the inner or reduced ends of which are located two radially extending lugs 17 which together with the lugs 14 of the screw threaded nut, are adapted to operate within the open space 18 formed by the tapering opposed meeting edges on each side of the jaw members. The enlarged shouldered portions of the tapering nuts are provided for slidably contacting with the inner beveled shouldered portions 4 on each end of the opposed jaw members and for preventing the tapering nuts from turning when the head of the threaded bolt is operated.

Projecting lugs 19 and 20 formed on each end of the jaw members and arranged for operating within the cutaway portions of the opposite jaw member, are provided for contacting with the lugs 14 and 17 of the tapering nuts 12 and 15 and preventing the same from becoming detached from the jaw members during shipment. The lugs 19 and 20 together with the cutaway portions of the members which receive them constitute overlapping end portions for the said members.

The expanding jaw members are roughened on their outer surfaces and are provided with the opposed flat and roughened side portions 21 which prevents their turning within a drilled hole when the bolt is operated.

In the modification shown in Fig. 6 the hook and counter-sunk portions for fastening the jaw members together, are of a slightly different shape the outer end of the hook portion being split as at 22 and bent outwardly to form ends for engaging with the beveled lower ends 23 of the counter-sunk 24.

In the modification shown in Fig. 7 the projection 25 on one of the jaw members, fits within the cut-away portion 26 of the opposite jaw member, while in the modification shown in Fig. 8 the hook and countersunk portions 27 and 28 are provided with engaging lugs 29 and 30, the engaging lugs on one side of the jaw members being opposed to those on the other.

In manufacturing, the jaw members are preferably cast of malleable iron and when assembled the hook portions of one of the jaw members are sprung outward and into position within the countersunk portion of the other or opposite jaw member, the tapering nuts of course, being first placed between the jaw members before they are connected together.

In use the contracted jaw members holding the tapering nuts are first placed within the hole formed in the wall, the threaded tapering nut being on the inner end. The threaded bolt is then inserted through a hole formed in the object to be secured to the wall, through the reamed tapering nut, jaw members and then screwed into the tapering threaded nut. The further turning of the bolt head causes the tapering nuts to move inwardly, the enlarged shouldered portions thereon engaging the tapering beveled shouldered end portions of the jaw members and causing the same to expand and securely grip the walls of the hole.

It is obvious that those skilled in the art may vary the details of construction and arrangements of parts without departing from the spirit of my invention and therefore I do not wish to be limited to such features except as may be required by the claims.

What is claimed as new is:

1. In an expansion bolt, the combination of opposed jaw members having overlapping end portions, a threaded bolt passing through the jaw members, tapering nuts mounted on each end of the bolt and arranged for contacting with each end of the jaw members for expanding the same upon the turning of the bolt.

2. In an expansion bolt, the combination of opposed jaw members, one of said jaw members being also provided with medially disposed countersunk portions and the other of said jaw members being provided with projecting hook portions adapted to fit within said countersunk portions, a threaded bolt passing through the jaw members, tapering nuts mounted on each end of the bolt and arranged for contacting with each end of the jaw members for expanding the same upon the turning of the bolt.

3. In an expansion bolt the combination of opposed jaw members having shouldered and beveled inner surfaces, one of said jaw members being also provided with medially disposed countersunk portions, and the other of said jaw members being provided with projecting hook portions adapted to fit within said cuntersunk portions, a threaded bolt passing through the jaw members and tapering shouldered nuts mounted on each end of the bolt and arranged for contacting with the beveled and shouldered surfaces of the jaw members for expanding the same upon the turning of the bolt.

In testimony whereof I affix my signature in presence of two witnesses.

DANIEL MASOR.

Witnesses:
JOHN A. DONEGHER,
W. E. LAWSON.